US012687999B2

(12) United States Patent
Li et al.

(10) Patent No.: US 12,687,999 B2
(45) Date of Patent: Jul. 21, 2026

(54) DISPLAY APPARATUS, DOOR BODY, AND CABINET BODY

(71) Applicants: Beijing BOE Display Technology Co., Ltd., Beijing (CN); BOE Technology Group Co., Ltd., Beijing (CN)

(72) Inventors: Xiang Li, Beijing (CN); Zhanchang Bu, Beijing (CN); Bochang Wang, Beijing (CN); Shaoming Yan, Beijing (CN); Jing Wang, Beijing (CN); Guojian Qu, Beijing (CN); Gang Li, Beijing (CN); Hongtao Zhang, Beijing (CN); Ming Tian, Beijing (CN); Yuan Wang, Beijing (CN); Weibing Gong, Beijing (CN); Feng Zi, Beijing (CN); Yawei Chen, Beijing (CN); Fei Dong, Beijing (CN); Qiaoke Zhou, Beijing (CN); Feng Gao, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 203 days.

(21) Appl. No.: 18/708,301

(22) PCT Filed: Apr. 28, 2023

(86) PCT No.: PCT/CN2023/091585
§ 371 (c)(1),
(2) Date: May 8, 2024

(87) PCT Pub. No.: WO2023/236686
PCT Pub. Date: Dec. 14, 2023

(65) Prior Publication Data
US 2025/0004693 A1    Jan. 2, 2025

(30) Foreign Application Priority Data

Jun. 6, 2022    (CN) ......................... 202210632134.X

(51) Int. Cl.
*G06F 3/147* (2006.01)
*F21V 8/00* (2006.01)
(Continued)

(52) U.S. Cl.
CPC .............. *G06F 3/147* (2013.01); *G06T 7/521* (2017.01); *G06V 40/10* (2022.01); *G16Y 10/75* (2020.01);
(Continued)

(58) Field of Classification Search
CPC ..................... G06F 3/147; G06T 7/521; G06T 2207/10048; G06T 2207/30196;
(Continued)

(56) References Cited

U.S. PATENT DOCUMENTS 8,700,451 B2 * 4/2014 Jayakody ........... G06Q 30/0255
705/14.1
9,863,722 B2 * 1/2018 Kim ........................ F25B 39/04
(Continued)

FOREIGN PATENT DOCUMENTS

CN     105930533 A     9/2016
CN     205608183 U  *  9/2016
(Continued)

OTHER PUBLICATIONS

Office Action dated Aug. 24, 2024, issued in counterpart CN Application No. 202210632134.X, with English translation. (20 pages).

*Primary Examiner* — Gelek W Topgyal
(74) *Attorney, Agent, or Firm* — WHDA, LLP

(57) ABSTRACT

The present disclosure relates to a display device, a door body and a cabinet body. The display device includes: an information collecting assembly configured to collect environment information; a communication module configured to perform wireless-communication linking to an Internet-
(Continued)

of-Things device, to transmit the environment information to the Internet-of-Things device, and receive multimedia information sent by the Internet-of-Things device; and a display module configured to display the multimedia information, wherein the multimedia information includes audio-video advertisement information.

17 Claims, 8 Drawing Sheets

(51) Int. Cl.

| | | |
|---|---|---|
| *G06T 7/521* | (2017.01) | |
| *G06V 40/10* | (2022.01) | |
| *G16Y 10/75* | (2020.01) | |
| *G16Y 20/10* | (2020.01) | |

(52) U.S. Cl.
   CPC ........ *G16Y 20/10* (2020.01); *F25D 2400/361* (2013.01); *F25D 2700/04* (2013.01); *G02B 6/0085* (2013.01); *G06T 2207/10048* (2013.01); *G06T 2207/30196* (2013.01)

(58) Field of Classification Search
   CPC ........ G06V 40/10; G16Y 10/75; G16Y 20/10; F25D 2400/361; F25D 2700/04; F25D 23/028; F25D 2700/02; F25D 2700/06; G02B 6/0085; G06Q 30/0251; G09F 2027/001; G09F 27/005; G09F 9/30; H04W 4/38
   See application file for complete search history.

(56) References Cited

U.S. PATENT DOCUMENTS

| | | | | |
|---|---|---|---|---|
| 11,480,828 B1 * | 10/2022 | Wang | ................ | G02F 1/133603 |
| 11,915,430 B2 * | 2/2024 | Yano | ........................ | G06T 7/215 |
| 2005/0068151 A1 | 3/2005 | Ushida | | |
| 2007/0016478 A1 * | 1/2007 | Hill | ........................... | G07F 9/02 |
| | | | | 705/14.49 |
| 2008/0004950 A1 * | 1/2008 | Huang | ............... | G06Q 30/0271 |
| | | | | 705/14.66 |
| 2012/0069569 A1 * | 3/2012 | Que | ........................ | F21V 29/70 |
| | | | | 362/249.02 |
| 2013/0093981 A1 * | 4/2013 | Yu | ........................ | G02B 6/0085 |
| | | | | 362/97.3 |
| 2017/0089632 A1 * | 3/2017 | Kang | .................... | G06F 1/1677 |
| 2018/0152312 A1 | 5/2018 | Zheng et al. | | |
| 2019/0317192 A1 * | 10/2019 | Wang | ....................... | G01S 7/003 |
| 2019/0353313 A1 * | 11/2019 | Chamberlain | ............ | F21S 4/28 |
| 2020/0088457 A1 | 3/2020 | Kang et al. | | |
| 2020/0088463 A1 | 3/2020 | Jeong et al. | | |
| 2021/0082127 A1 * | 3/2021 | Yano | ...................... | G06V 20/53 |
| 2021/0254888 A1 * | 8/2021 | Cremaschi | ......... | G06Q 30/0268 |
| 2024/0240853 A1 * | 7/2024 | Avakian | ................ | F25D 29/003 |

FOREIGN PATENT DOCUMENTS

| | | | | |
|---|---|---|---|---|
| CN | 106057103 A | | 10/2016 | |
| CN | 106303628 A | | 1/2017 | |
| CN | 107850383 A | | 3/2018 | |
| CN | 109269209 A | | 1/2019 | |
| CN | 109413382 A | | 3/2019 | |
| CN | 209014869 U | * | 6/2019 | |
| CN | 113446813 A | | 9/2021 | |
| CN | 111031238 B | | 12/2021 | |
| CN | 215895932 U | | 2/2022 | |
| CN | 114980008 A | | 8/2022 | |
| JP | 2002-140509 A | | 5/2002 | |
| JP | 2005-101887 A | | 4/2005 | |
| JP | 2018-133045 A | | 8/2018 | |
| KR | 20040024243 A | | 3/2004 | |
| KR | 20050055449 A | | 6/2005 | |
| KR | 20170053248 A | | 5/2017 | |
| KR | 102360453 B1 | * | 2/2022 | ............. H04N 7/181 |
| WO | 2006/081601 A1 | | 8/2006 | |
| WO | 2016/074463 A1 | | 5/2016 | |
| WO | WO-2021058436 A1 | * | 4/2021 | ............. G06F 3/017 |

* cited by examiner

DISPLAY APPARATUS, DOOR BODY, AND CABINET BODY

The present application claims the priority of the Chinese patent application filed on Jun. 6, 2022 before the Chinese Patent Office with the application number of 202210632134.X and the title of "DISPLAY APPARATUS, DOOR BODY, AND CABINET BODY", which is incorporated herein in its entirety by reference.

TECHNICAL FIELD

The present disclosure relates to the technical field of displaying and, more particularly, to a display device, a door body and a cabinet body.

BACKGROUND

With the development of the information technology, the Internet of Things has become a keyword of the new era, and the new retail mode based on big information and artificial intelligence has gradually emerged worldwide. However, most of the current display devices merely have a single function of displaying.

SUMMARY

A display device is provided by the present disclosure, wherein the display device includes:

an information collecting assembly configured to collect environment information;

a communication module configured to perform wireless-communication linking to an Internet-of-Things device, to transmit the environment information to the Internet-of-Things device, and receive multimedia information sent by the Internet-of-Things device; and a display module configured to display the multimedia information, and/or display the environment information; and the multimedia information includes at least audio-video advertisement information.

In an alternative implementation, a quantity of the information collecting assembly is more than one, different information collecting assemblies are configured to collect category information corresponding to different objects in an environment, the objects include human bodies and articles in the environment, and the category information include image category information and voice category information.

In an alternative implementation, the environment information includes flow-rate information, the information collecting assembly includes a flow-rate-information collecting module, and the flow-rate-information collecting module is disposed at one side of a light-exiting face of the display module; and the flow-rate-information collecting module is configured to collect human-body image information in an environment located at one side of a light-exiting face of a display screen, and based on the human-body image information collected within a target time duration, determine the flow-rate information.

In an alternative implementation, the human-body image information includes depth information, and the flow-rate-information collecting module includes a time-of-flight camera (TOF) module; the TOF module includes an infrared-laser emitting module, a time sensor, a calculating component and a sensing camera lens;

the infrared-laser emitting module is configured to emit an infrared laser, and the sensing camera lens is configured to gather the infrared laser that is reflected back;

the time sensor is configured to, based on the infrared laser gathered by the sensing camera lens, generate the depth information; and the calculating component is configured to, based on the depth information generated by the time sensor, determine the flow-rate information in a refrigerator exterior environment.

In an alternative implementation, the TOF module further includes a structure support, and a first bearing plate and a second bearing plate fixed to two sides of the structure support, respectively;

the infrared-laser emitting module and the calculating component are fixed to the first bearing plate, and the time sensor is fixed to the second bearing plate; and the first bearing plate is provided with a camera-lens through hole, the structure support is provided with a support through hole corresponding to the camera-lens through hole, and the sensing camera lens passes through the support through hole and is fixed inside the camera-lens through hole.

In an alternative implementation, the environment information includes voice information, and the information collecting assembly further includes a voice-information collecting module; the voice-information collecting module is configured to, when an external-target signal is sensed by the voice-information collecting module, collect the voice information;

the communication module is configured to transmit the voice information to an Internet of Things, and acquire target multimedia information corresponding to the voice information from the Internet of Things; and the display module is configured to display the target multimedia information, and environment information corresponding to the voice information collected by the information collecting assembly.

In an alternative implementation, the voice-information collecting module includes a photoelectric switch, the photoelectric switch includes an outer shell embedded into one side of a light-exiting face of the display module, and a target pattern is concavely or convexly engraved at the outer shell; and the photoelectric switch is configured to, when the external-target signal is sensed by the photoelectric switch, control the voice-information collecting module to collect the voice information, and lighten the target pattern.

In an alternative implementation, the environment information includes image information of an environment located at one side of a light-exiting face of the display module, and the information collecting assembly further includes a frontally placed image collecting module configured to, in an on-state, collect the image information of the environment at the one side of the light-exiting face of the display module.

In an alternative implementation, when the environment information includes image information and voice information of an environment of one side of the light-exiting face of the display module, the device further includes a support;

wherein both of a voice-information collecting module for collecting the voice information and a frontally placed image collecting module for collecting the image information are integrated on the support.

In an alternative implementation, the environment information includes an article information in an environment at one side away from the light-exiting face of the display module;

the information collecting assembly includes a rear placed image collecting module disposed at the back face of the display module, and the rear placed image collecting module includes a built-in camera, an angle sensor and a controlling unit;

the angle sensor is configured to detect an opening angle of the display module; and the controlling unit is configured to, when the opening angle is greater than or equal to a preset angle, trigger the built-in camera to perform image collection to the environment on the one side away from the light-exiting face of the display module, to obtain the article information in the environment.

In an alternative implementation, the display module sequentially includes, starting from the light-exiting face, a glass cover plate, a liquid-crystal display panel, a light equalizing device, a light guiding plate, a reflector plate, a light bar and a metal back plate.

In an alternative implementation, a plurality of heat dissipating fins are disposed at the light bar, and a groove is disposed at a surface of each of the heat dissipating fins.

In an alternative implementation, the communication module includes a wireless-communication device and a housing covering the wireless-communication device, and the housing is provided with a plurality of heat dissipating holes.

In an alternative implementation, the heat dissipating holes are strip-shaped heat dissipating holes, and gap lengths of the strip-shaped heat dissipating holes are between 31 millimeters and 50 millimeters.

A door body is further provided by the present disclosure, wherein the door body includes the display device.

In an alternative implementation, the door body further includes a door frame, and the door frame is configured to install the display device.

In an alternative implementation, the door frame and the display device are rotatably connected to each other, in a retracting state, the display device is located in a plane where the door body is located, and in an opening state, the display device rotates out of the plane where the door body is located.

In an alternative implementation, the door body further includes a rotating member, one side of the display device is rotatably connected to one side of the door frame by the rotating member, and the other side of the display device is embedded into the other side of the door frame.

In an alternative implementation, the door body further includes a positioning member, one end of the positioning member is detachably mounted to the other side of the door frame, and the other side of the display device is connected to the positioning member.

A cabinet body is further provided by the present disclosure, wherein the cabinet body has an object storing space, and includes the door body according to any one of the above embodiments, or includes the display device according to any one of the above embodiments; and a light-exiting face of the display device is opposite to the object storing space.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the specific embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DESCRIPTION OF THE REFERENCE NUMBERS

Figure 1:
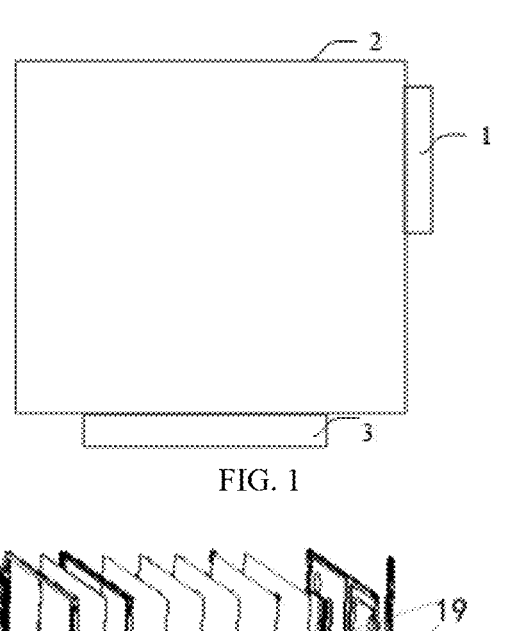
FIG. 1 schematically shows a schematic structural diagram of a display device according to the present disclosure.

1: information collecting assembly; 2: communication module; 3: display module; 101: TOF module; 102: frontally placed image collecting module and the voice-information collecting module; 103: rear placed image collecting module; 4: glass cover plate; 05: module border frame; 06: liquid-crystal display panel; 07: plastic frame of the backlight module in the module; 08, 09 and 10: optical films; 11: light guiding plate (LGP); 12: reflector plate; 13: light bar; 14: metal back plate; 15: X-PCB outer shell; 16: power board; 17: PC (personal computer) system mainboard; 18: metal box base; 19: positioning member; 20: SOC system board; 21: door-opening-closing sensor; 23: logic board TCON (also referred to as screen driving board); 24: cover plate; 1011: front housing; 1012: first cover plate; 1013: second cover plate; 1014: cable; 1015: rear housing; 1016: rear-housing blocking cover; 201: first infrared-laser emitting module; 202: second infrared-laser emitting module; 203: first bearing plate; 204: camera-lens through hole; 205: camera lens; 206: time sensor; 207: second bearing plate; 208: calculating component; 209: structure support; 211: protective glass camera lens; 212: lens cover; 213: lens barrel; 214: lens plate/adhesive plate; 215: support; 216: infrared optical filter; 217: sensor chip; 218: reinforcing steel sheet; 219: flexible circuit board; 301: support; 302: front-camera mounting hole; 303: front-camera glass cover plate; 304: front-facing-camera support; 305: photoelectric switch; 306: microphone; 307: metal-plate rear cover; 308: fixing screws; 401: front metal housing; 402: antenna outer shell; 403: perforated mylar film; 404: power-supply AC (alternating current) line; 405: power board; 406: PC system board; 407: rear metal housing; 111: camera lens of the rear placed image collecting module; 112: motor; 113: infrared optical filter; 114: support; 115: sensor chip; 116: reinforcing steel sheet; 117: cotton adhesive tape; 118: flexible circuit board; and 119: connector.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

With the development of the information technology, the Internet of Things has become a keyword of the new era, and the new retail mode based on big information and artificial intelligence has gradually emerged worldwide. "Internet of Everything" has become a major goal of the information technology.

Therefore, in the field of displays, one of the goals is to realize "Internet of Everything" of display devices, and to integrate the functions of looking, listening, speaking and so on, so as to satisfy the various demands in goods storage, advertisement, logistics distribution and so on, to truly realize a new retail Internet-of-Things interaction solution based on display screens.

In the related art, in order to realize the new retail Internet-of-Things interaction solution based on the display screens, the approach generally includes firstly integrating an assembly having the function of the Internet of Things into an existing product, subsequently integrating a display device having the function of displaying into the existing product, for example, integrating an Internet-of-Things function assembly on a refrigerator door, subsequently installing the display screen on the refrigerator door, and connecting the display screen and the Internet-of-Things function assembly, thus the refrigerator door can collect in real time the states and the demands of the products inside the refrigerator and the consumers outside the refrigerator.

However, when the display screen is integrated into the existing product, because of a high integration level, when the display screen or the Internet-of-Things function assembly malfunctions, it is usually required to completely dissemble the existing product, for example, the refrigerator door dissembled, and then the display screen and the Internet-of-Things function assembly are detached from the refrigerator door. That results in the problems of difficulty in the repairment and a high repairment cost.

In view of the above, the present disclosure provides an intelligent display device having the function of the Internet of Things. The display device can integrate the function of the Internet of Things, and thus can be integrated into existing products as a whole, for example, integrated into a refrigerator as a whole to be used as the refrigerator door, thereby the problems of current display screens of a single function and a high maintenance cost are solved.

Referring to FIG. 1, FIG. 1 shows a display device according to an embodiment of the present disclosure. The display device includes:

an information collecting assembly configured to collect environment information;

a communication module configured to perform wireless-communication linking to an Internet-of-Things device, to transmit the environment information to the Internet-of-Things device, and receive multimedia information sent by the Internet-of-Things device; and a display module configured to display the multimedia information, and/or display the environment information; and the multimedia information includes at least audio-video advertisement information.

In the present embodiment, the display device is integrated with the communication module, the information collecting assembly and the display module. When the display device is used, it may collect the environment information, may also perform communication linking with the Internet-of-Things device to perform information interaction, may also play the multimedia information sent by the Internet-of-Things device, and may also display the collected environment information. The multimedia information includes at least audio-video advertisement information. Certainly, in a case, the multimedia information may further include the collected environment information. If the collected environment information is article information in the environment, the display module may display the article information in the environment. Certainly, the article information may be the information of an article stored in a box body, and the information of the article stored in the box body may be collected by using the information collecting assembly at the back face of the display module. Accordingly, the display device may be used to play the advertisement information sent by another device, and may display the environment information collected by the information collecting assembly, to facilitate the user to observe intuitively.

By using the display device according to the present disclosure, because the display device can collect the environment information, and transmit the collected environment information to the Internet-of-Things device in the Internet of Things, and is used to display the multimedia information acquired from the Internet of Things, the display device can integrate the functions of information display, information collection, and information transmission via the Internet of Things, thereby the function of the display device is optimized. The display device can be, as a whole, integrated into existing products, for example, integrated into and used at a refrigerator as the refrigerator door of the refrigerator, thereby the problems of current display screens of a single function and a high maintenance cost are solved.

Figure 2:
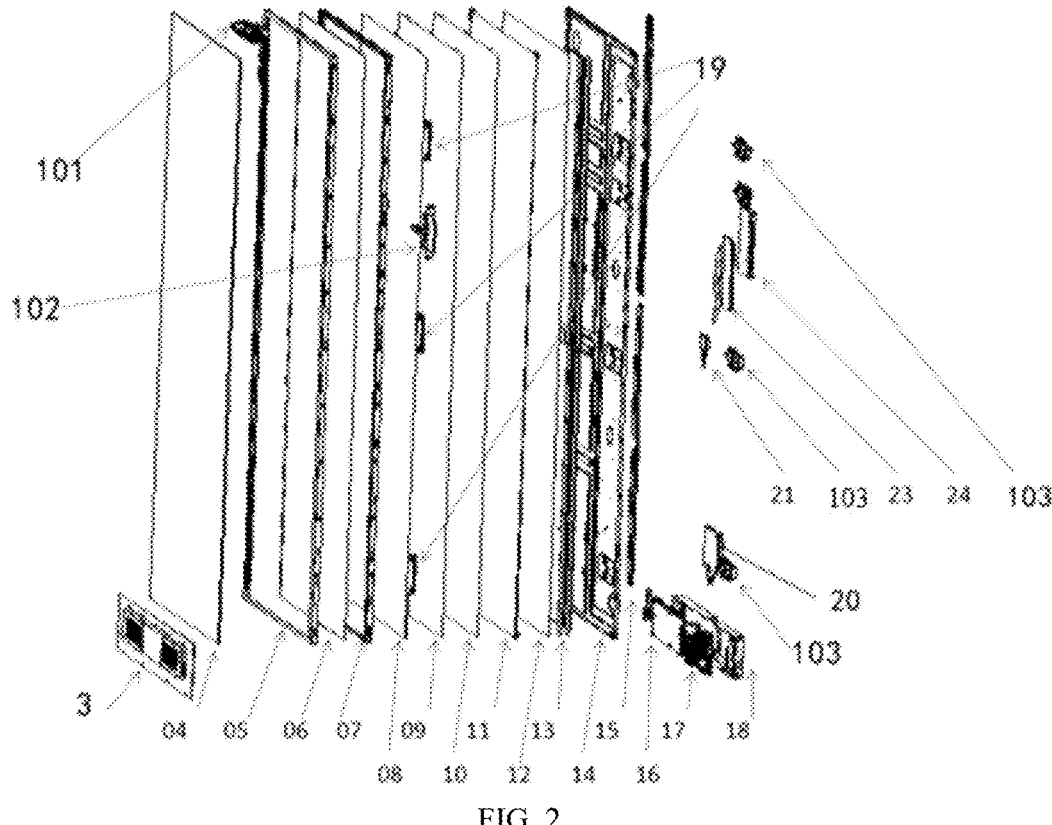
FIG. 2 schematically shows an exploded structural view of a display device according to the present disclosure.

Referring to FIG. 2, FIG. 2 shows an exploded view of a display device. The display device according to the present application will be described in detail with reference to FIG. 2. As shown in FIG. 2, the display device includes the display module, the communication module and a plurality of information collecting assemblies.

The communication module 3 is located at the side face of the display module, and the plurality of information collecting assemblies, according to the object needed to be performed the information collection, may be located at the side face, the back face or the light-exiting face of the display module. It should be noted that the communication module and the information collecting assemblies do not shield the light-exiting face of the display module.

Different information collecting assemblies are configured to collect category information corresponding to different objects in an environment, the objects include human bodies and articles in the environment, and the category information include image category information and voice category information. In an example, for a human body in the environment, the image information and the voice information of the human body may be collected, for an article in the environment, the image information of the article and the depth information of the article may be collected. Certainly, in an environment in which it is required to strictly protect the privacy information of people, for a human body in the environment, the human-body information may be collected by using infrared light, thereby the protection on the privacy of the user is realized without leaking the body-appearance-feature information of the user.

FIG. 2 shows a schematic diagram of the entire structure of the display device. Because the display device includes the information collecting assembly, the communication module and the display module, in an example of the present disclosure, the information collecting assembly, the communication module and the display module will be described individually below:

(1) The Information Collecting Assembly.

In an example of the present disclosure, according to the collected environment information, the information collecting assembly may include a flow-rate-information collecting module, a voice-information collecting module, a frontally placed image collecting module and a rear placed image collecting module.

The flow-rate-information collecting module is configured to collect flow-rate information, wherein the flow-rate information characterizes the person flow rate in the environment. The voice-information collecting module is configured to collect the voice information of a person, wherein the voice information, in the display device, may be used for the interaction between the person and the display device. The frontally placed image collecting module is configured to collect the image information in the environment, for example, the human-body image information in the environment. Moreover, the rear placed image collecting module is configured to collect the article information in the environment at the side of the shadow face of the display module, so that, when the display device is installed on a cabinet body, it can perform image collection to the article stored inside the cabinet body.

(1.1) The Flow-Rate-Information Collecting Module.

The flow-rate-information collecting module is disposed at the side of the light-exiting face of the display module. The flow-rate-information collecting module is configured to collect the human-body information in the environment located at the side of the light-exiting face of the display module, and based on the human-body information collected within a target time duration, determine the flow-rate information.

Referring to FIG. 2, the flow-rate-information collecting module may be located at the upper side of the display module, and may have a certain included angle with the display face of the display module, to cause the flow-rate-information collecting module to incline toward the display screen.

In practice, in order not to leak the privacy information of the user, the human-body information collected by the flow-rate-information collecting module may be the depth information collected based on infrared light, and subsequently the flow-rate information is determined based on the depth information.

In particular implementations, the flow-rate-information collecting module may be a time-of-flight camera (TOF) module. The TOF module includes an infrared-laser emitting module, a time sensor, a calculating component and a sensing camera lens;

the infrared-laser emitting module is configured to emit an infrared laser, and the sensing camera lens is configured to gather the infrared laser that is reflected back;

the time sensor is configured to, based on the infrared laser gathered by the sensing camera lens, generate the depth information; and the calculating component is configured to, based on the depth information generated by the time sensor, determine the flow-rate information in the external environment.

The principle of the TOF module is to calculate the distance by measuring the duration that is required from the emission to the returning of a light, to acquire the depth information. According to the principle, the measurement may be generally classified into two types, which are D-ToF direct measurement and I-ToF indirect measurement. The D-ToF refers to measuring the time difference that is required from the emission to the returning of a light, multiplying it by the light speed, and dividing by 2, to obtain the depth information. The I-ToF refers to measuring the phase difference between the emitted light wave and the returned light wave of a light, to obtain the depth information.

Figures 3, 4:
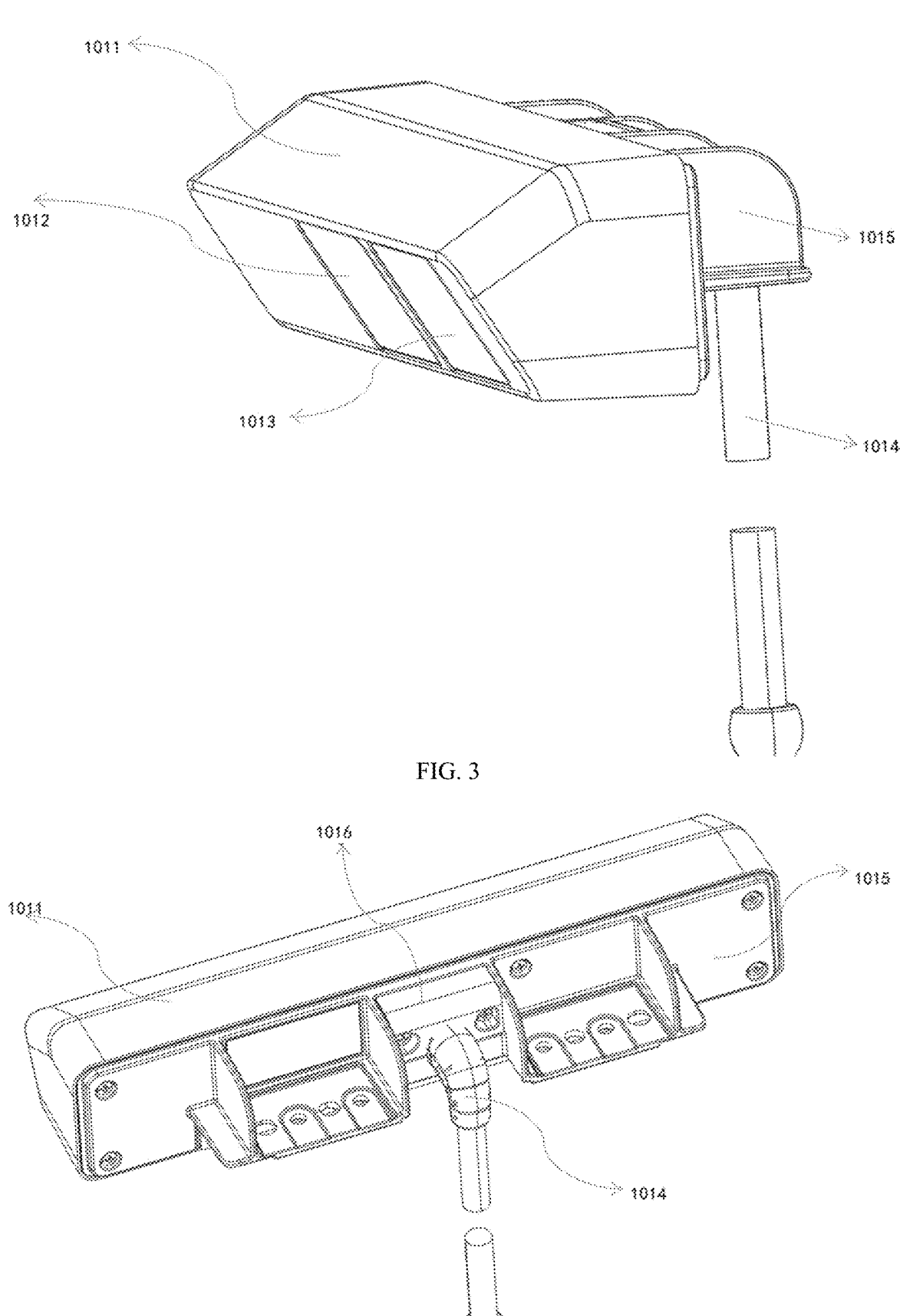
FIG. 3 schematically shows a schematic diagram of an appearance of a TOF module according to the present disclosure.
FIG. 4 schematically shows a schematic diagram of the appearance of a TOF module according to the present disclosure that is observed in the perspective of the light entering side of the display screen.
Figure 5:
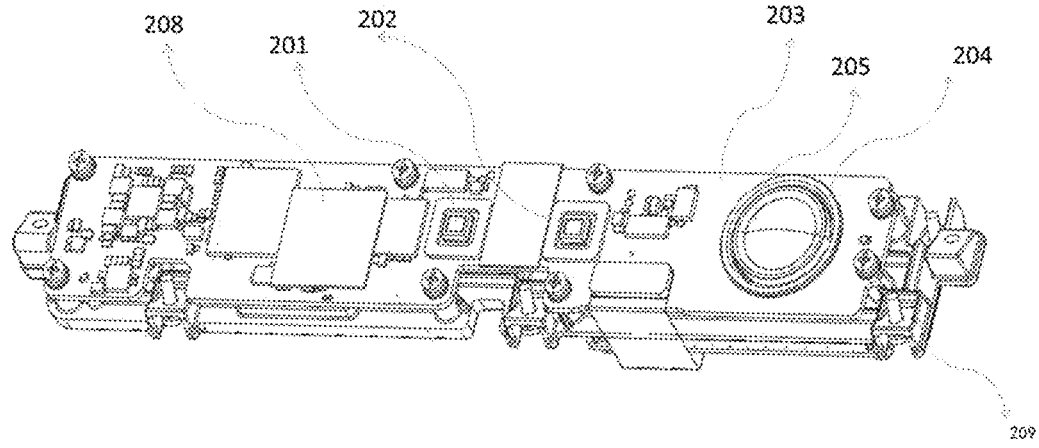
FIG. 5 schematically shows an exploded structural view of a TOF module according to the present disclosure.
Figure 6:
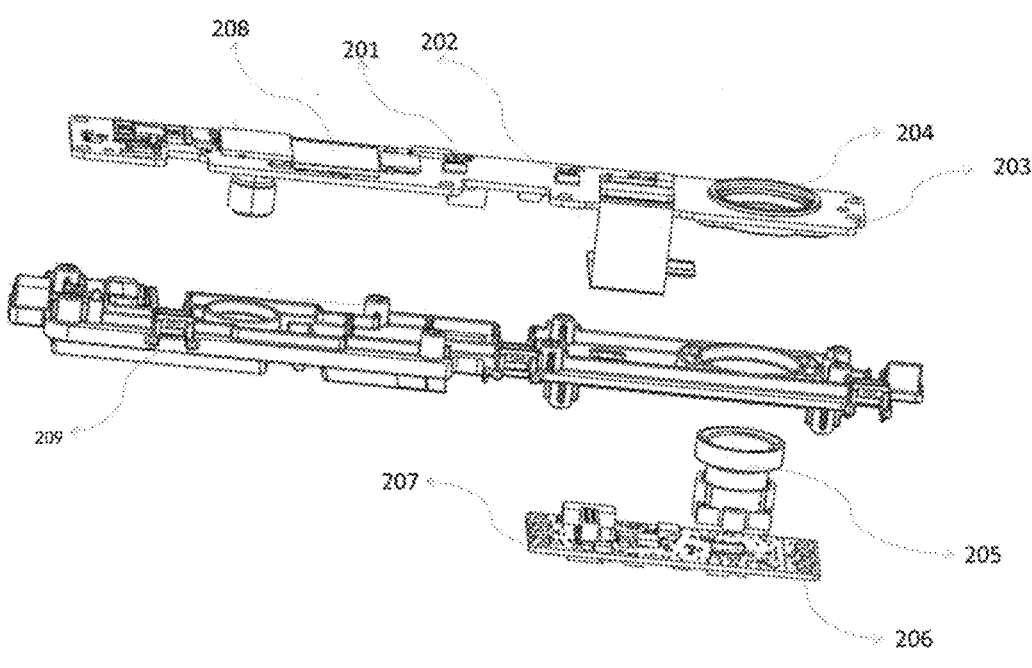
FIG. 6 schematically shows a structural block diagram of a TOF module according to the present disclosure.

Referring to FIGS. 3-6, FIG. 3 is a schematic diagram of an appearance of the TOF module. FIG. 4 is a schematic diagram of the appearance of the TOF module that is observed in the perspective of the light entering side of the display screen. FIG. 5 is an exploded view of the TOF module. FIG. 6 is a structural block diagram of the TOF module.

As shown in FIGS. 3 and 4, the time-of-flight camera TOF module includes a first cover plate, a second cover plate, a front housing and a rear housing. The infrared-laser emitting module, the time sensor, the calculating component and the sensing camera lens are located in the cavity formed by the first cover plate, the second cover plate, the front housing and the rear housing. The first cover plate and the second cover plate are made from a material that permits infrared light to pass through. The infrared-laser emitting module is provided within the groove regions that are covered by the first cover plate and the second cover plate individually, and the sensing camera lens may protrude out of the front housing, to collect the infrared laser that is reflected back.

In some examples, the materials of the first cover plate and the second cover plate are the same. For example, in some examples, both of the first cover plate and the second cover plate are provided with an infrared coating film, to reduce interference such as the ambient light. Both of the first cover plate and the second cover plate provided with an infrared coating film may be deemed as an infrared optical filter.

The rear housing includes a rear surface, and the front housing is fixed to the rear housing via the rear surface to together realize the coverage of the entire machine. For example, as shown in FIG. 6, the front housing inclines relative to the rear surface. For example, in some examples, the range of the angle of inclination of the front housing relative to the rear surface may be (20°, 40°); in other words, it may be greater than or equal to 20°, and less than or equal to 40°, but is not limited thereto. Certainly, in some embodiments, the front housing may also be parallel to the rear surface. In some examples, the range of the angle of inclination of the front housing relative to the rear surface may be (0°, 40°); in other words, it may be greater than or equal to 0°, and less than or equal to 40°, but is not limited thereto.

In some examples, a plurality of screw grooves may be disposed in the front housing, and a plurality of screw holes corresponding to the plurality of screw grooves may be disposed in the rear surface of the rear housing, thus the front housing and the rear housing may be installed integrally by using a plurality of screws. It should be noted that, in the installation of the time-of-flight-camera module, the rear surface is usually perpendicular to the ground. If the direction perpendicular to the ground is the vertical direction, then the rear surface is parallel to the vertical direction.

In some examples, the time-of-flight-camera module may further include a rear-housing blocking cover. The rear-housing blocking cover is used to block the fourth opening. Furthermore, the rear-housing blocking cover may further additionally fix and protect the cable, and, by detaching the rear-housing blocking cover, the cable can be replaced quickly.

As shown in FIGS. 5 and 6, FIGS. 5 and 6 show the specific internal structure of the TOF module, which specifically includes a structure support, and a first bearing plate and a second bearing plate fixed to two sides of the structure support;

the infrared-laser emitting module and the calculating component are fixed to the first bearing plate, and the time sensor is fixed to the second bearing plate; and the first bearing plate is provided with a camera-lens through hole, the structure support is provided with a support through hole corresponding to the camera-lens through hole, and the sensing camera lens passes through the support through hole and is fixed inside the camera-lens through hole.

Because the first bearing plate and the second bearing plate are fixed to the two sides of the structure support, the first bearing plate, the structure support and the second bearing plate form a stacking structure, and the stacking structure inclines relative to the vertical direction. It should be understood that, in practical applications, the angle of inclination of the stacking structure relative to the vertical direction may be regulated by regulating the above-described wedge angle. Certainly, the pitch angle of the front housing and the pitch angle of the stacking structure should maintain equal, so that the plane where the first bearing plate is located is parallel to the front surface. It should be understood that both of the pitch angle of the front surface and the pitch angle of the stacking structure may be configured according to the demand of the practical application scene.

As shown in FIGS. 5 and 6, the first bearing plate, the structure support and the second bearing plate are arranged in layer configuration, and the first bearing plate and the second bearing plate are fixed to the two sides of the structure support. For example, in some examples, the first bearing plate may be fixed to the structure support by using a plurality of (for example, 8, but is not limited thereto) screw hole positions. Similarly, the second bearing plate may be fixed to the structure support by using a plurality of (for example, 8, but is not limited thereto) screw hole positions. It should be noted that the embodiments of the present disclosure include but are not limited thereto.

Two infrared-laser emitting modules may be disposed, which are a first infrared-laser emitting module and a second infrared-laser emitting module. The first infrared-laser emitting module and the second infrared-laser emitting module are arranged on the first bearing plate side by side, and are located at the side of the first bearing plate that is away from the structure support. The first bearing plate includes a camera-lens through hole located at the side of the second infrared-laser emitting module that is away from the first infrared-laser emitting module, the structure support includes a support through hole corresponding to the camera-lens through hole, and the camera lens passes through the support through hole and is fixed to the camera-lens through hole. For example, in some examples, the camera lens may be fixed to the camera-lens through hole by using a lens rubber ring, thereby the fixing, damping and dust prevention of the camera lens are realized and the interfering lights are reduced. For example, in some examples, a center of the first infrared-laser emitting module, a center of the second infrared-laser emitting module and a center of the camera lens (i.e., a center of the camera-lens through hole) are located substantially in the same straight line.

The time sensor is disposed at the second bearing plate, and is configured to sense the infrared light collected by the camera lens to generate the depth information. For example, in some examples, the time sensor may sense the infrared light collected by the camera lens (for example, the infrared light is the infrared lights that are emitted by the first infrared-laser emitting module and the second infrared-laser emitting module, reflected by an external object, filtered by the infrared optical filters and subsequently collected by the camera lens), measure the duration during which the infrared light goes from the emitting units of the infrared-laser emitting modules (i.e., the first infrared-laser emitting module and the second infrared-laser emitting module) to the sensing unit (for example, the sensing unit of the time sensor is disposed at the side of the second bearing plate that is closer to the structure support), and simultaneously record a 2D black-and-white image and an infrared grayscale image of the photographed object. The infrared optical filters merely permit the infrared light of the corresponding wavelengths emitted by the emitting units to pass, and filter out the optical interference of other wavelengths. It should be noted that the embodiments of the present disclosure include but are not limited thereto. For example, in some other examples, the time sensor may measure the phase difference between the emitted light wave and the returned light wave to obtain the depth information. For example, the time sensor includes a CCD (charge-coupled device)/CMOS (complementary metal-oxide-semiconductor) chip and so on for sensing the infrared light. It should be understood that, in order to satisfy the requirement of medium-and-long-distance detection, the time sensor may employ a high-QE (quantum efficiency)-value high-resolution sensor (for example, a TOF CCD of 640*480 pixels).

For example, the time-of-flight-camera module may further include a calculating component. The calculating component includes a system-level chip (System on Chip, SoC, for example, a vision processor), a random access memory (for example, a DDR (double data rate) chip), a flash memory chip and so on. The calculating component is disposed on the first bearing plate, and the calculating component is located at the side of the first infrared-laser emitting module that is away from the second infrared-laser emitting module. For example, the calculating component is configured to, according to the depth information generated by the time sensor, determine at least one of the quantity and the distances of the human bodies within the visual field of the time-of-flight-camera module, the total activity duration within the visual field, and the residence time within the visual field, and provide identifiers for the human bodies within the visual field of the time-of-flight-camera module, for example, IDs. In the embodiments of the present disclosure, the calculating component and the time sensor are located on different bearing plates, which facilitates the heat dissipation of the internal components of the time-of-flight-camera module.

The time-of-flight-camera module may further include a first flexible circuit board. For example, both of the first bearing plate and the second bearing plate are a printed circuit board, and the first bearing plate and the second bearing plate are coupled by using the first flexible circuit board.

As shown in FIGS. 3 and 4, the front housing includes a containing cavity, to contain the stacking structure formed by the first bearing plate, the structure support and the second bearing plate. The structure support is fixed to the front housing. For example, in some examples, the structure support may be fixed to the front housing 1 by using a plurality of (for example, 6, but is not limited thereto) wedge-shaped screw grooves.

In other words, in the time-of-flight-camera module according to the embodiments of the present disclosure, the emitting units (i.e., the first infrared-laser emitting module and the second infrared-laser emitting module) and the sensing unit (i.e., the time sensor) are integrated on two different printed circuit boards. By that the upper and lower printed circuit boards are arranged in layer configuration, and the camera-lens through hole is provided at the upper-layer printed circuit board (i.e., the first bearing plate, and, correspondingly, the lower-layer printed circuit board is the second bearing plate) to install the camera lens, the thickness of the internal components of the time-of-flight-camera module can be reduced, and the time-of-flight-camera module as a whole is more compact. In addition, by disposing the structure support between the upper and lower printed circuit boards to lock the upper and lower printed circuit boards, which facilitates the firmness of the internal components of the time-of-flight-camera module.

(1.2) The Frontally Placed Image Collecting Module and the Voice-Information Collecting Module.

If the frontally placed image collecting module and the voice-information collecting module are provided, the environment information may include the image information of the environment located at the side of the light-exiting face of the display module, and the voice information in the environment.

Certainly, as stated above, the image information of the environment may be collected by the frontally placed image collecting module, and the voice information may be collected by the voice-information collecting module. The frontally placed image collecting module is configured to, in an on-state, collect the image information of the environment at the side of the light-exiting face of the display module. The voice-information collecting module is configured to, when an external-target signal is sensed by the voice-information collecting module, collect the voice information in the environment.

Correspondingly, the communication module is specifically configured to transmit the voice information to an Internet of Things, and acquire target multimedia information corresponding to the voice information from the Internet of Things.

The display module is specifically configured to display the target multimedia information, and environment information corresponding to the voice information collected by the information collecting assembly.

In the present embodiment, the voice-information collecting module may, when it has collected the voice of the user, send the voice to the Internet-of-Things device via the communication module. The Internet-of-Things device, after identifying the voice, may send the corresponding target multimedia information to the display device. For example, if the user wants to acquire the weather information, after he speaks "search for the weather" with voice, the Internet-of-Things device sends the latest weather information to the display device.

Certainly, in another implementation scene, the voice information may also be used for acquiring the information collected by the display device itself by using the information collecting assembly; in other words, the display device, after identifying the voice information, may display the corresponding information collected by the information collecting assembly. For example, when the display device is applied to a refrigerator, it is spoken with voice that "what articles are in the refrigerator", and, accordingly, the display device, after identifying it, may display the article information in the refrigerator that is currently collected by the information collecting assembly by using the display module. In such a scene, when the display device has identified that the voice aims at acquiring the information collected by the information collecting assembly, it may also trigger in real time the corresponding information collecting assembly to collect the corresponding information, for example, triggering in real time the rear placed image collecting module to collect the article information in the refrigerator.

Certainly, the article information collected by the rear placed image collecting module may include the image information of the article and the information of the position where the article is located.

In another example of the present disclosure, the voice-information collecting module may include a photoelectric switch, the photoelectric switch includes an outer shell, and a target pattern is concavely or convexly engraved at the outer shell, wherein the target pattern is located at the light exiting side of the display screen. The photoelectric switch is configured to, when the external-target signal is sensed by the photoelectric switch, control the voice-information collecting module to collect the voice information, and lighten the outer shell, to display the target pattern.

In the present embodiment, in order to sufficiently realize the interaction between the display device and the user, the photoelectric switch for detecting the user information may be disposed. Accordingly, the target signal may be an infrared signal of the user, and when the target signal is detected, the voice-information collecting module is started up to perform the collection of the voice information. In order to realize that object, in an example of the present disclosure, that may be realized by using the photoelectric switch.

A target pattern is concavely or convexly engraved at the outer shell of the photoelectric switch. When the target signal is detected, the voice-information collecting module may be started up, and the outer shell may be lightened. In an example, an illuminating light may be disposed inside the outer shell, and when the target signal is detected, the illuminating light is turned on, thus the lightened target pattern can be seen at the side of the light-exiting face of the display module.

Certainly, the target pattern may be configured according to practical demands, which is not limited in the embodiments of the present application.

Figures 7, 8:
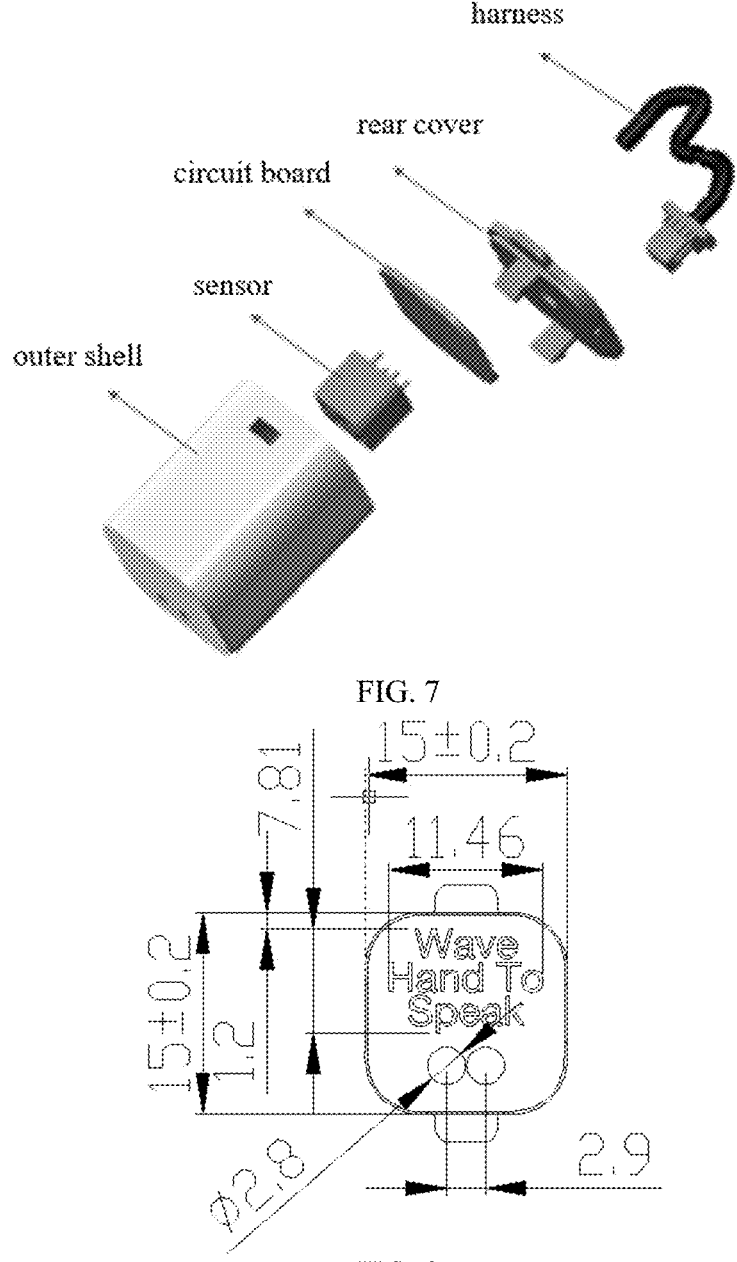
FIG. 7 schematically shows an exploded view of a voice-information collecting module according to the present disclosure.
FIG. 8 schematically shows a schematic diagram of the target pattern on the outer shell of a photoelectric switch according to the present disclosure.

Referring to FIG. 7, FIG. 7 shows an exploded view of the voice-information collecting module. Referring to FIG. 8, FIG. 8 shows a schematic diagram of the target pattern on the outer shell of the photoelectric switch.

As shown in FIG. 7, more specifically, the photoelectric switch includes an outer shell, an infrared inductive sensor, a circuit board, a rear cover and a harness. The infrared inductive sensor and the circuit board are located in the cavity of the outer shell. After the rear cover are covered on the outer shell, one end of the harness passes through the rear cover and is connected to the circuit board, and the other end of the harness may be connected to a voice gathering module in the voice-information collecting module, for example, a microphone.

As shown in FIG. 8, FIG. 8 is a schematic diagram of the structural size of the upper surface of the outer shell of the photoelectric switch. At a lower position of the upper surface, two holes of the diameter of 2.8 mm are trenched, to facilitate the sensor to expose the emitter and the receiver. The target pattern shown in FIG. 8 is concavely engraved.

In an example, the front face of the PCB (printed circuit board) circuit board inside the photoelectric switch includes two 1-LED (light emitting diode) lights. The LED lights supply the light source for the photoelectric switch, and after they have been lightened, the target pattern can be displayed through the outer shell. The front face of the PCB circuit board further includes the infrared inductive sensor and a peripheral resistor, to receive a starting-up signal according to infrared sensing. The back face of the circuit board includes a main-chip signal-transmission harness. The main chip receives the signal sent by the infrared sensor, processes the signal, and sends a starting-up command to the voice gathering module (for example, a microphone) in the voice-information collecting module. The harness passes through a center round hole of the rear housing, and is connected to a microphone harness at the other end. All of the commands received and sent by the photoelectric switch are transmitted via signal lines.

Figure 9:
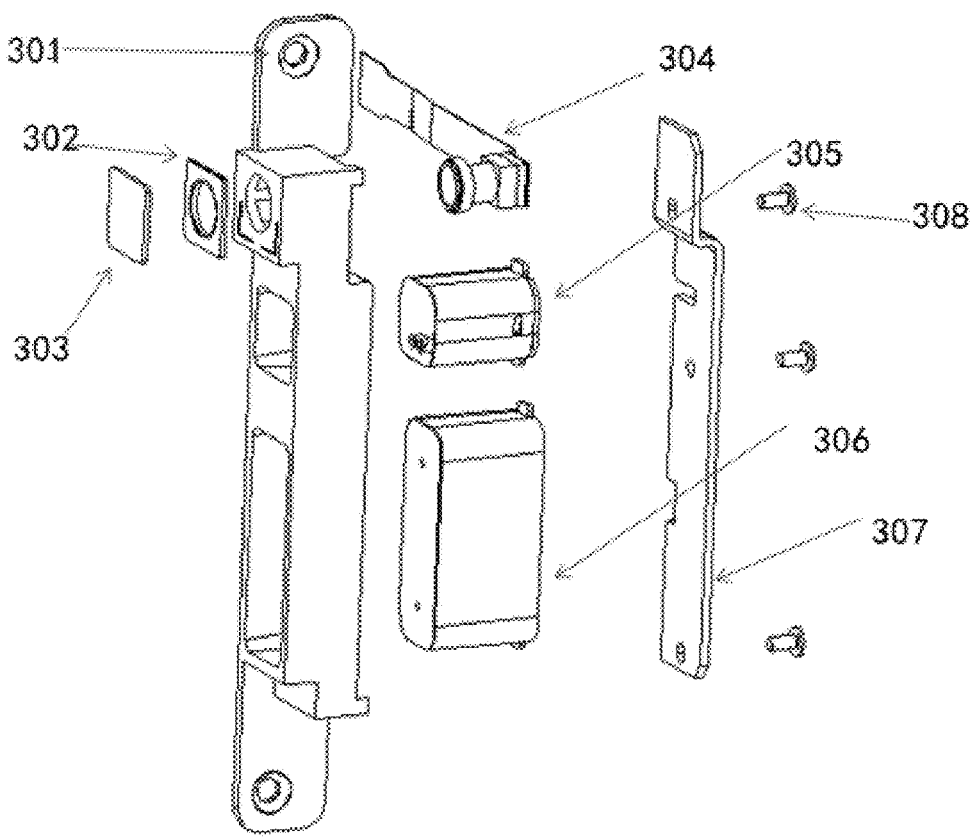
FIG. 9 schematically shows an exploded view of an integrated structure of a frontally placed image collecting module and a voice-information collecting module according to the present disclosure.

In an example of the present disclosure, the frontally placed image collecting module and the voice-information collecting module may be integrated together. Referring to FIG. 9, FIG. 9 shows an exploded view of an integrated structure of the frontally placed image collecting module and the voice-information collecting module. The device further includes a support, and the frontally placed image collecting module and the voice-information collecting module may be integrated on the support.

Specifically, the microphone and the photoelectric switch serve as the voice-information collecting module, and a front camera serves as the frontally placed image collecting module. The support is fabricated by using a cast-iron process. In the assembling, the support is provided with the mounting holes for mounting the microphone, the photoelectric switch and the front camera, and the microphone, the photoelectric switch and the front camera are mounted inside the mounting holes. Subsequently, the metal-plate rear cover is fixed to the support by using fixing screws, thus the frontally placed image collecting module and the voice-information collecting module are integrated together.

Figure 10:
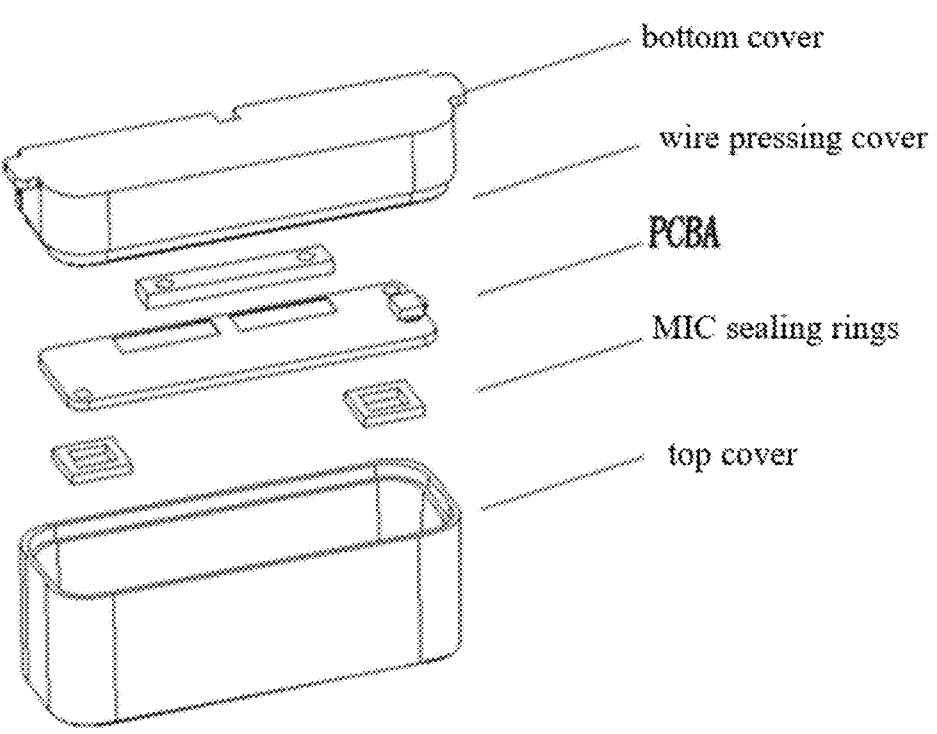
FIG. 10 schematically shows an exploded view of a microphone in a voice-information collecting module according to the present disclosure.

In an example, referring to FIG. 10, FIG. 10 shows an exploded view of the microphone in the voice-information collecting module. The microphone includes a top cover, two sound receiving MICs (Microphones), a PCB circuit board PCBA, a wire pressing cover and a bottom cover. The top cover of the microphone is screen-printed with a black LOGO, to facilitate the consumer to identify. The surface of the outer shell has upper and lower small holes corresponding to the positions of the sealing rings of the sound receiving MICs, to facilitate the sound collection.

In another example, the circuit board of the microphone is designed as follows. The two ends of the front face of the circuit board are individually provided with one microphone, and the main chip. The main chip may, according to the sound recorded by the microphones, perform processing such as denoising and algorithm optimization. At the same time, the main chip contains a serial-port interface, and may transmit and receive the instructions of the photoelectric switch and the PC. The back face of the circuit board mainly includes a reset key and plugholes. The reset key is used for the subsequent software upgrading operations. The wire plugholes are used to connect the harness, to maintain the signal-data transmission between the photoelectric switch and the PC. In this example, two microphones are used for the sound reception, wherein one of the microphones serves as the primary microphone, and the other of the microphones serves as the auxiliary microphone. After one of the microphones maintains stably and clearly recording sound, and the other of the microphones actively eliminates the physical noise and samples the environmental noise, the sound waveform undergoes analysis and phase operation, is superposed to the sampling waveform of the primary microphone, and undergoes algorithm processing, and the obtained sound is more clearly, and has phase offsetting.

Figures 11, 12:
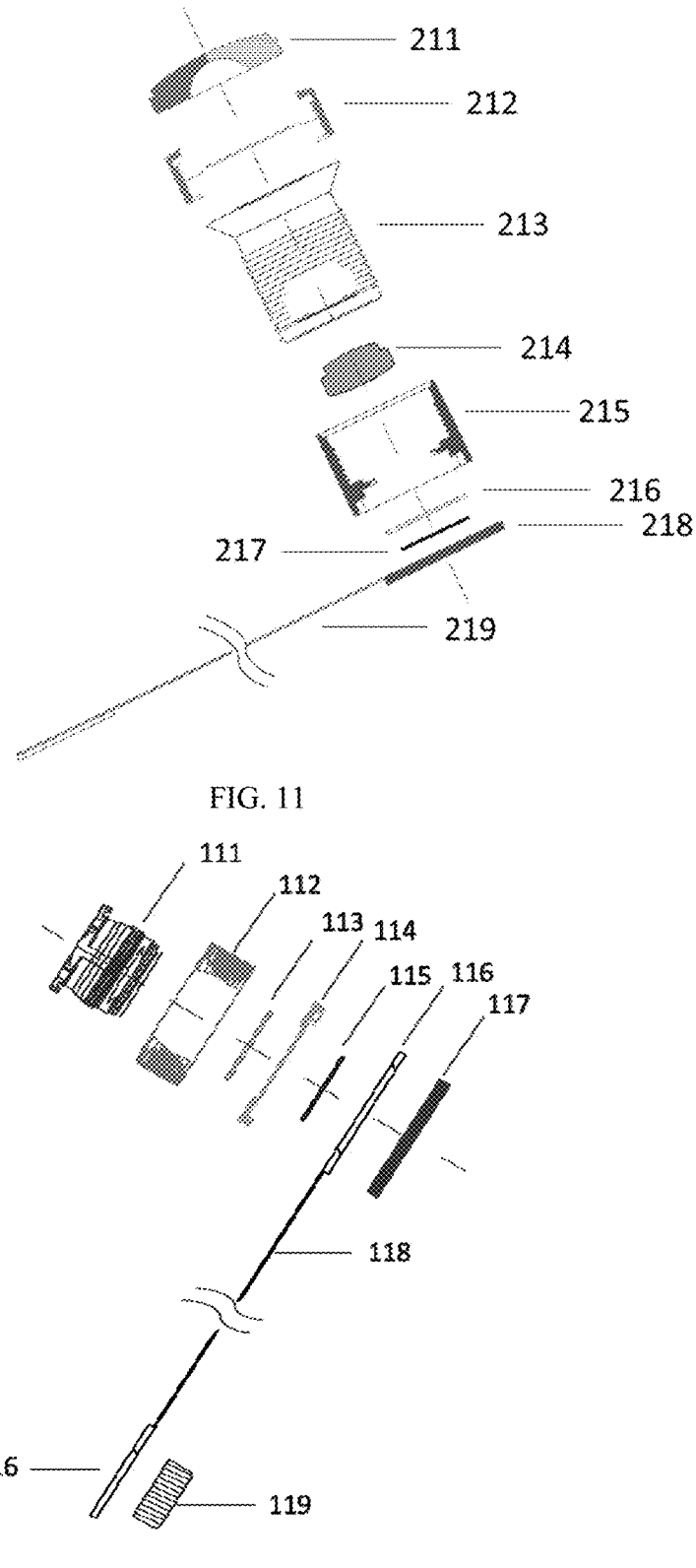
FIG. 11 schematically shows an exploded view of a frontally placed image collecting module according to the present disclosure.
FIG. 12 schematically shows an exploded view of a rear placed image collecting module according to the present disclosure.

Referring to FIG. 11, FIG. 11 shows an exploded view of the frontally placed image collecting module. As shown in FIG. 11, the frontally placed image collecting module includes a protective glass camera lens, a lens cover, a lens barrel, a lens plate/adhesive plate, a support, an infrared optical filter, a sensor chip, a reinforcing steel sheet, a flexible circuit board and a connector, and the components are mounted to each other by welding, threaded connection or snap fitting.

(1.3) The Rear Placed Image Collecting Module.

The rear placed image collecting module is disposed at the back face of the display module, and the environment information includes an article information in an environment at the side away from the light-exiting face of the display module; the rear placed image collecting module includes a built-in camera, an angle sensor and a controlling unit;

the angle sensor is configured to detect the opening angle of the display module; and the controlling unit is configured to, when the opening angle is greater than or equal to a preset angle, trigger the built-in camera to perform image collection to the environment at the side away from the light-exiting face of the display module, to obtain the article information in the environment.

In the present embodiment, the angle sensor is configured to detect the opening angle of the display module. Specifically, when the display device is installed on the existing products, for example, the refrigerator door of a refrigerator, when the refrigerator door is opened the display device is started up accordingly. Accordingly, the opening angle of the display device relative to the original installation position can be detected by using the angle sensor.

The preset angle may be configured according to practical demands, for example, 45 degrees. Accordingly, when the opening angle is greater than or equal to a preset angle, the built-in camera is turned on, to start to perform image collection to the environment at the side away from the light-exiting face of the display module, for example, performing image collection to the interior of the refrigerator, to obtain the article information in the environment.

The built-in camera may perform image collection to different positions of the environment at the side away from the light-exiting face of the display module, thereby the information of the articles stored at the different positions is obtained. In an application scene, in a shopping-mall retail service, the display device may be installed at the cabinet door of a large-scale refrigerator. When the article information is sent to the Internet-of-Things device, for example, a device in the warehousing, the user may, according to the article information, determine which refrigerator and which articles require replenishment, thereby replenishment in time is made.

Referring to FIG. 12, FIG. 12 shows an exploded view of the rear placed image collecting module. As shown in FIG. 12, the rear placed image collecting module includes a camera lens, a motor, an infrared optical filter, a support, a sensor chip, a reinforcing steel sheet, a cotton adhesive tape, a flexible circuit board and a connector, and the components are mounted to each other by welding, threaded connection or snap fitting.

In the present disclosure, the frontally placed image collecting module and the rear placed image collecting module are formed by a front-facing-camera module and a front-facing-camera main control panel, and a rear-facing-camera module and a rear-facing-camera main control panel, respectively. The designs of the front-facing-camera main control panel and the rear-facing-camera main control panel may be totally the same.

In an example of the present disclosure, each of the frontally placed image collecting module and the rear placed image collecting module includes a camera main control panel. Both of the front face and the back face of the main control panel are provided with a copper-exposure region, to enhance the antistatic capacity of the main control panel. The camera main control panels are mounted to the back plate of the entire machine via mounting holes and screws.

Both of the front-facing-camera module and the rear-facing-camera module are connected to the back plate of the display device by using a plastic protecting box, which serves for both of positioning and protection at the same time.

The display screen will be described in detail below.

(2) The Display Screen

As shown in FIG. 2, the display module sequentially includes, starting from the light-exiting face, a glass cover plate, a liquid-crystal display panel, a light equalizing device, a light guiding plate, a reflector plate, a light bar and a metal back plate. Certainly, as shown in FIG. 2, the display module correspondingly further includes a PC system mainboard and a metal box base of the PC system mainboard serving to fix a power board and the PC system mainboard.

Because the display screen has the glass cover plate, the liquid-crystal display panel, the light equalizing device, the light guiding plate (LGP), the reflector plate, the light bar and the metal back plate, it has a certain thickness. In such a case, a plurality of information collecting assemblies may be disposed at the back face or the side face of the display screen.

The glass cover plate is a 3T silk-screen physically strengthened aluminosilicate glass cover plate.

The display module further includes a plastic frame for fixing the liquid-crystal display panel. The plastic frame is made from a PC plastic material by one-piece injection molding, and serves to fix the liquid-crystal panel. The FPC (Flexible Printed Circuit) wiring position of the liquid-crystal panel and the FPC wiring position of a touch device are disposed at the left and right sides of the plastic frame. A positioning device of the display module and the position for fixing the display module to the back plate are disposed at the upper and lower sides of the plastic frame. The liquid-crystal display panel includes the liquid-crystal panel and an X-PCB circuit board, and the panel and the X-PCB circuit board are connected to each other by the FPCs. In order to prevent vibration, a part of it is fixed to the plastic frame by using an adhesive tape.

Certainly, the display module further includes a border frame. The border frame is made from a metal EGI material, has the thickness of 0.8 t, and is used to fix the glass cover plate, the liquid-crystal display panel, the light equalizing device, the light guiding plate, the reflector plate and the light bar. The border frame is fixed to the metal back plate by using the screws, and all of the four sides of the border frame are provided with positioning holes and mounting holes for the fixing with the plastic frame.

The light guiding plate is made from PMMA (polymethyl methacrylate), and serves to guide the light rays.

As shown in FIGS. 2, 08, 09 and 10 are optical films. The backlight films are POP and a diffuser, and are fixed to the back plate by suspension loops. All of the three films have the same structure, and the tandem structure of the films includes, starting from the side closer to the liquid-crystal display panel, from top to bottom, a diffuser sheet, a prism clad sheet and a diffuser sheet. In order to reach a better optical effect, the types and the tandem structure of the films may be alternated The metal back plate is made from an EGI material, has the thickness of 1.0 t, and serves for supporting. A convex part at the highest position of the back plate is higher than the plates at the back face, to protect the plates.

The light bar is formed by LEDs and PCB boards, includes totally 276 EA LEDs, and employs 7020 encapsulation.

In an example of the present disclosure, the glass cover plate is a touch panel adapted for the liquid-crystal display panel.

In an example of the present disclosure, a plurality of heat dissipating fins are disposed at the light bar, and a groove is disposed at the surface of each of the heat dissipating fins.

In an example of the present disclosure, as shown in FIG. 2, the display module further includes an SOC system board, the SOC system board includes an SOC chip and an SOC back plate, and the SOC back plate is fixed to the back face of the metal back plate by using the screws.

Figure 13:
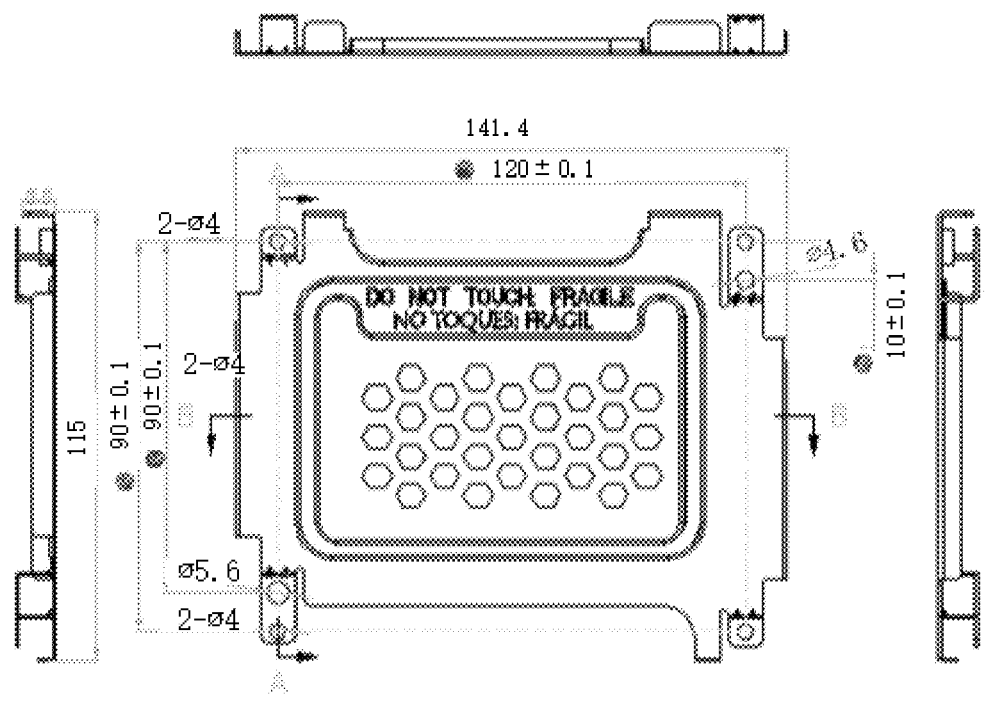
FIG. 13 schematically shows a schematic structural diagram of an appearance of an SOC back plate according to the present disclosure.

Referring to FIG. 13, FIG. 13 shows a schematic structural diagram of the appearance of the SOC back plate. As shown in FIG. 13, the surface of the SOC back plate is provided with honeycomb heat dissipating holes, and is provided with a reinforcing rib, to increase the strength of the SOC back plate.

In an example of the present disclosure, the device further includes a door-opening-closing sensor, and the door-opening-closing sensor is fixed to the back face of the metal back plate by using the screws. The door-opening-closing sensor, when the display device is mounted to the cabinet door of the cabinet body, may detect whether the cabinet door is opened, and, if the cabinet door is opened, the door-opening-closing sensor may control the angle sensor of the rear placed image collecting module to start detecting the opening angle of the display device, so as to, if the opening angle is greater than or equal to a preset angle, collect the article information.

(3) The Communication Module

In an example of the present disclosure, the communication module includes a wireless-communication device and a housing covering the wireless-communication device, and the housing is provided with a plurality of heat dissipating holes.

Figure 14:
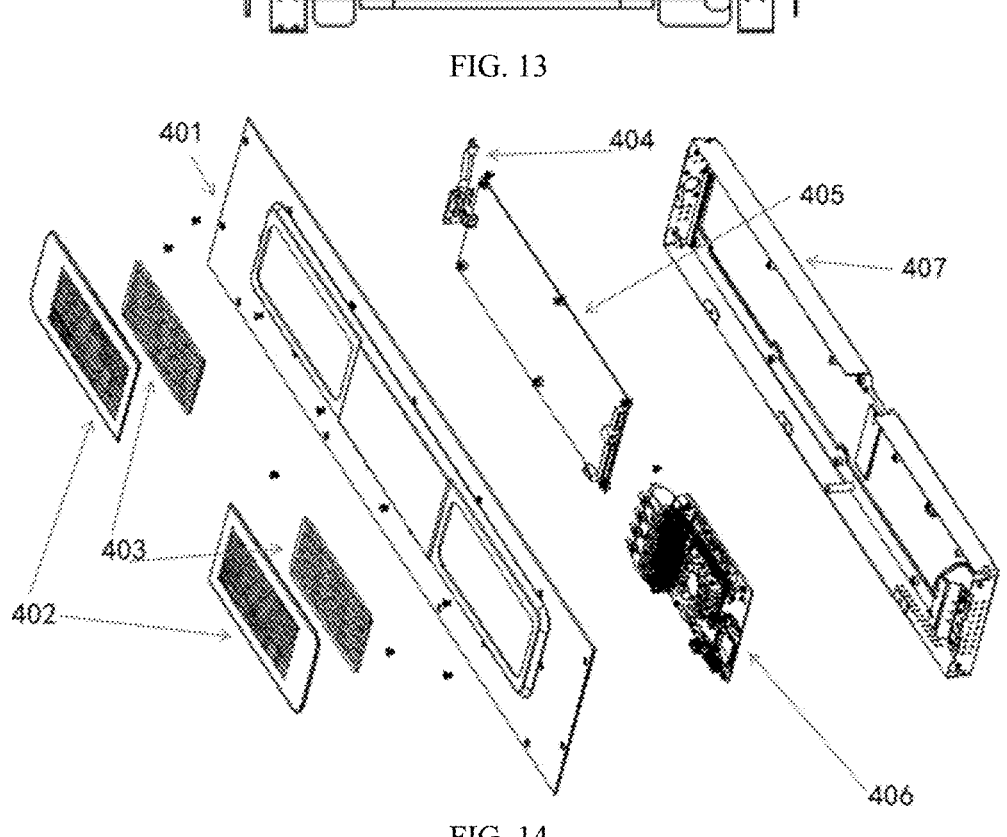
FIG. 14 schematically shows an exploded view of a communication module according to the present disclosure.

As shown in FIG. 2, the communication module is disposed at the side of the display device that is opposite to the TOF module, for example, the lower side. Referring to FIG. 14, FIG. 14 shows an exploded view of the communication module. As shown in FIG. 14, the communication module includes a front metal housing, a rear metal housing, an antenna outer shell (housing), a plastic cover plate, a power-supply AC line, a power board and a PC system board.

The front metal housing and the rear metal housing together serve as the outer shell of the communication module. The antenna outer shell is the housing, made from a plastic material, and adhesively bonded to the surface of the front metal housing by using a glue. A perforated mylar film is disposed inside the plastic cover plate, to facilitate to pass safety regulation tests, and is fully adhered to the inner surface of the antenna outer shell. The power-supply AC line is fixed to the side face of the rear housing. The power board supplies electric power to the entire product, has a size of 320*100 mm, and is fixed to the left side of the rear housing by using the screws. The PC system board has a size of 120*100 mm, and is fixed to the right side of the rear housing by using the screws. The rear housing is of the structure of a tray, made from an EGI material, and fixed to the side wall of the bottom side of the display module by using the screws.

The surface of the housing is hollow structure, which can satisfy the heat dissipation of the internal PC and the power board.

In an example of the present disclosure, because the wireless-communication device is integrated with the functions of Bluetooth and wireless communication, and at the same time, the electronic component elements should have the capacity of antistatic ESD, the gap length of the surface hollow structure of the housing should be greater than or equal to 31.25 millimeters, and less than or equal to 50 millimeters. Therefore, the heat dissipating holes are strip-shaped heat dissipating holes, and the gap lengths of the strip-shaped heat dissipating holes are between 31 millimeters and 50 millimeters. For example, the size may be configured to be between 31.25 millimeters and 50 millimeters.

That is because, generally, the energy of ESD interference is distributed in 0-300 MHz, the wavelength of its electromagnetic wave $\lambda \geq 1$ meters, and $\lambda/20=50$ millimeters. Moreover, regarding the Internet-of-Things device and other electronic products of wireless receiving and emitting, the frequency of the wireless signals is 2.4 GHz or 5 GHZ, the wavelength $2=125$ millimeters or 60 millimeters, and $24=31.25$ millimeters or 15 millimeters.

According to the above-described theory, when the gap length $<\lambda/20$, the energy of the electromagnetic wave can be effectively inhibited. When the gap length $\geq \lambda/4$, the gap becomes a very effective electromagnetic radiator. Therefore, if, at the outer shell corresponding to the antenna, the gap length is configured to be in the interval (31.25 millimeters, 50 millimeters), i.e., greater than 31.25 millimeters and less than 50 millimeters, the useful signals can pass freely while the ESD interference can be inhibited.

In an example of the present disclosure, heat dissipating holes of equal sizes are evenly distributed at all of the four side faces of the rear metal housing, and correspond to the positions of the power board and the PC, so as to satisfy the requirement of heat dissipation of the electronic component elements.

On the basis of the same inventive concept, an application of the display device according to the above embodiments is provided. Specifically, it may be applied to a door body. Therefore, a door body including the display device according to the above embodiments is provided.

In practice, the door body may be a refrigerator door. The refrigerator door may be the refrigerator door of a single-door refrigerator, a double-door refrigerator, a three-door refrigerator and a four-door refrigerator, and its size may be 42 inches or 48 inches. In a specific implementation, the display device may be embedded into the refrigerator door, and the display face of the display device may be at located in the same plane as the front face of the refrigerator door.

In an embodiment of the present disclosure, the door body further includes a door frame, and the door frame is for installing the display device. Accordingly, the display device may be directly installed into the door frame to be used as the door body. In such a case, the overall size of the display device is adapted for the door frame.

In an embodiment of the present disclosure, in order to facilitate to repair the display device when the display device malfunctions, the display device may rotate relative to the door frame, to leave the plane where the door frame is located. Specifically, the door frame and the display device are rotatably connected to each other, in a retracting state, the display device is located in the plane where the door body is located, and in an opening state, the display device rotates out of the plane where the door body is located.

Certainly, in a specific example, at least one rotating member may be included, one side of the display device is rotatably connected to one side of a mounting frame by the at least one rotating member, and the other side of the display device is embedded into the other side of the mounting frame, to facilitate the display device to rotate with respect to the mounting frame.

Figure 15:
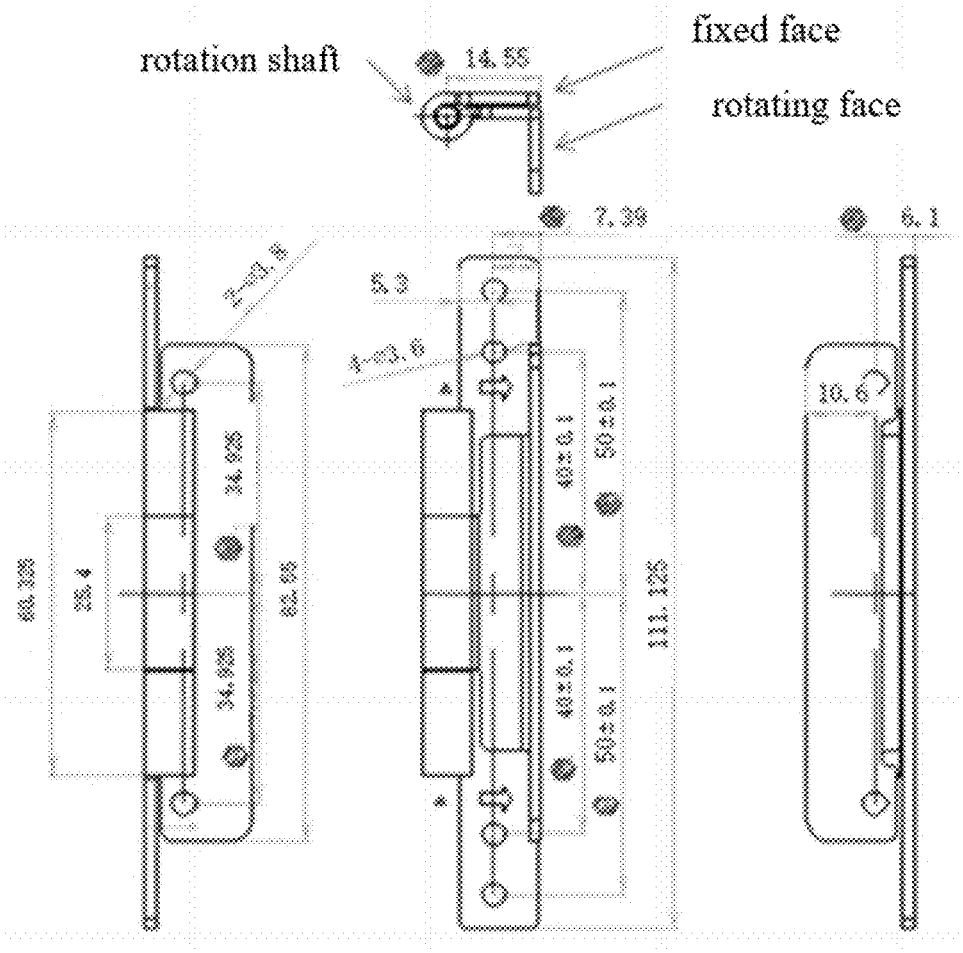
FIG. 15 schematically shows a schematic structural diagram of a rotating member according to the present disclosure.

Referring to FIG. 15, FIG. 15 shows a schematic structural diagram of the rotating member. As shown in FIG. 15, the rotating member includes a rotation shaft, a fixed face and a rotating face. Accordingly, the rotating member can enable the display device to be rotated and opened, to facilitate quick repairment. The fixed face of the rotating member is fixed to the side face of the display device. After the screws on the rotating face are detached from the door frame, the rotating face can rotate around the rotation shaft, so that the module can realize a repairing mode of "door in door".

Correspondingly, in another embodiment of the present disclosure, the display device further includes a positioning member, one end of the positioning member is detachably mounted to the other side of the door frame, and the other side of the display device is connected to the positioning member.

When the display device requires repairment, the positioning member may be detached, and the display device may be rotated out, thus the back face and the side face of the display device are repaired.

Certainly, in such a case, both of the information collecting assembly and the communication module may be disposed at the back face of or the side of the display device that is rotatable relative to the door frame.

Figure 16:
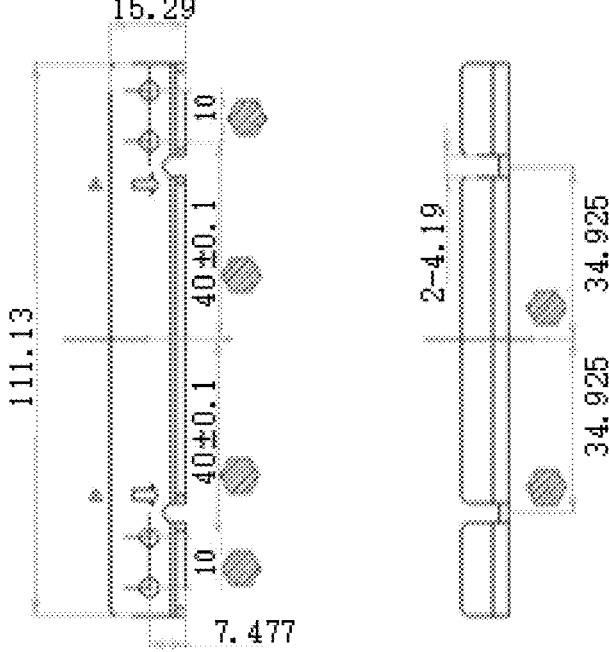
FIG. 16 schematically shows a schematic structural diagram of a positioning member according to the present disclosure.

Referring to FIG. 16, FIG. 16 shows a schematic structural diagram of the positioning member. As shown in FIG. 16, the positioning member includes clipping grooves, the clipping grooves may be snap-fitted to the door frame, the positioning member is provided with mounting holes, and the display device may be connected to the positioning member by mounting screws adapted for the mounting holes.

On the basis of the same inventive concept, another application of the display device according to the above embodiments is provided. Specifically, it may be applied to a cabinet body. The cabinet body has an object storing space, and further includes the door body according to the above embodiments, or includes the display device according to the above embodiments. The light-exiting face of the display device is opposite to the object storing space.

The information collecting assembly of the display device may be configured to collect the article information in the object storing space. In an example, the cabinet body may be a refrigerator. Specifically, the refrigerator may be a single-door refrigerator, a double-door refrigerator, a three-door refrigerator and a four-door refrigerator. The size of the door body may be 42 inches or 48 inches, and the size of the display device may be slightly less than the size of the door body, thus the display device may be embedded into the door frame to be used as the door body.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "contain" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The display device, the door body and the cabinet body according to the present disclosure are described in detail above. The principle and the embodiments of the present disclosure are described herein with reference to the particular examples, and the description of the above embodiments is merely intended to facilitate to comprehend the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptive alternations of the present disclosure, wherein those variations, uses or adaptive alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A display device, comprising:

an information collecting assembly configured to collect environment information;

a communication module configured to perform wireless-communication linking to an Internet-of-Things device, to transmit the environment information to the Internet-of-Things device, and receive multimedia information sent by the Internet-of-Things device; and a display module configured to display the multimedia information, and/or display the environment information, wherein:

the multimedia information comprises at least audio-video advertisement information;

the environment information comprises flow-rate information, the information collecting assembly comprises a flow-rate-information collecting module, and the flow-rate-information collecting module is disposed at one side of a light-exiting face of the display module; and the flow-rate-information collecting module is configured to collect human-body image information in an environment located at one side of a light-exiting face of a display screen, and based on the human-body image information collected within a target time duration, determine the flow-rate information;

the human-body image information comprises depth information, and the flow-rate-information collecting module comprises a time-of-flight camera (TOF) module; the TOF module comprises an infrared-laser emitting module, a time sensor, a calculating component and a sensing camera lens;

the infrared-laser emitting module is configured to emit an infrared laser, and the sensing camera lens is configured to gather the infrared laser that is reflected back;

the time sensor is configured to, based on the infrared laser gathered by the sensing camera lens, generate the depth information;

the calculating component is configured to, based on the depth information generated by the time sensor, determine the flow-rate information in a refrigerator exterior environment;

the TOF module further comprises a structure support, and a first bearing plate and a second bearing plate fixed to two sides of the structure support, respectively;

the infrared-laser emitting module and the calculating component are fixed to the first bearing plate, and the time sensor is fixed to the second bearing plate; and the first bearing plate is provided with a camera-lens through hole, the structure support is provided with a support through hole corresponding to the camera-lens through hole, and the sensing camera lens passes through the support through hole and is fixed inside the camera-lens through hole.

2. The device according to claim 1, wherein a quantity of the information collecting assembly is more than one, different information collecting assemblies are configured to collect category information corresponding to different objects in an environment, the objects comprise human bodies and articles in the environment, and the category information comprises image category information and voice category information.

3. The device according to claim 1, wherein the environment information comprises voice information, and the information collecting assembly further comprises a voice-information collecting module; the voice-information collecting module is configured to, when an external-target signal is sensed by the voice-information collecting module, collect the voice information;

the communication module is configured to transmit the voice information to an Internet of Things, and acquire target multimedia information corresponding to the voice information from the Internet of Things; and the display module is configured to display the target multimedia information, and display the environment information corresponding to the voice information.

4. The device according to claim 3, wherein the voice-information collecting module comprises a photoelectric switch, the photoelectric switch comprises an outer shell embedded into one side of a light-exiting face of the display module, and a target pattern is concavely or convexly engraved at the outer shell; and the photoelectric switch is configured to, when the external-target signal is sensed by the photoelectric switch, control the voice-information collecting module to collect the voice information, and lighten the target pattern.

5. The device according to claim 1, wherein the environment information comprises image information of an environment located at one side of a light-exiting face of the display module, and the information collecting assembly further comprises a frontally placed image collecting module configured to, in an on-state, collect the image information of the environment at the one side of the light-exiting face of the display module.

6. The device according to claim 1, wherein when the environment information comprises image information and voice information of an environment of one side of a light-exiting face of the display module, the device further comprises a support;

wherein both of a voice-information collecting module for collecting the voice information and a frontally placed image collecting module for collecting the image information are integrated on the support.

7. The device according to claim 1, wherein the environment information comprises article information in an environment at one side away from a light-exiting face of the display module; the information collecting assembly comprises a rear placed image collecting module, and the rear placed image collecting module comprises a built-in camera, an angle sensor and a controlling unit;

the angle sensor is configured to detect an opening angle of the display module; and the controlling unit is configured to, when the opening angle is greater than or equal to a preset angle, trigger the built-in camera to perform image collection to the environment at the one side away from the light-exiting face of the display module, to obtain the article information in the environment.

8. The device according to claim 1, wherein the display module sequentially comprises, starting from the light-exiting face, a glass cover plate, a liquid-crystal display panel, a light equalizing device, a light guiding plate, a reflector plate, a light bar and a metal back plate.

9. The device according to claim 8, wherein a plurality of heat dissipating fins are disposed at the light bar, and a groove is disposed at a surface of each of the heat dissipating fins.

10. The device according to claim 1, wherein the communication module comprises a wireless-communication device and a housing covering the wireless-communication device, and the housing is provided with a plurality of heat dissipating holes.

11. The device according to claim 10, wherein the heat dissipating holes are strip-shaped heat dissipating holes, and gap lengths of the strip-shaped heat dissipating holes are between 31 millimeters and 50 millimeters.

12. A door body, wherein the door body comprises the display device according to claim 1.

13. The door body according to claim 12, wherein the door body further comprises a door frame, and the door frame is configured to install the display device.

14. The door body according to claim 13, wherein the door frame and the display device are rotatably connected to each other, in a retracting state, the display device is located in a plane where the door body is located, and in an opening state, the display device rotates out of the plane where the door body is located.

15. The door body according to claim 14, wherein the door body further comprises a rotating member, one side of the display device is rotatably connected to one side of the door frame by the rotating member, and the other side of the display device is embedded into the other side of the door frame.

16. The door body according to claim 15, wherein the door body further comprises a positioning member, one end of the positioning member is detachably mounted to the other side of the door frame, and the other side of the display device is connected to the positioning member.

17. A cabinet body, wherein the cabinet body has an object storing space, and comprises the door body according to claim 12; and a light-exiting face of the display device is opposite to the object storing space.

\* \* \* \* \*